(12) United States Patent
Zhang et al.

(10) Patent No.: US 9,430,020 B2
(45) Date of Patent: Aug. 30, 2016

(54) METHOD, DEVICE AND SYSTEM FOR DATA STREAM TRANSMISSION

(71) Applicant: Huawei Technologies Co., Ltd., Shenzhen, Guangdong (CN)

(72) Inventors: Hongguo Zhang, Shenzhen (CN); Guofeng Qian, Shenzhen (CN); Chengguang Niu, Shenzhen (CN); Qi Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 213 days.

(21) Appl. No.: 14/176,712

(22) Filed: Feb. 10, 2014

(65) Prior Publication Data
US 2014/0157014 A1 Jun. 5, 2014

Related U.S. Application Data

(63) Continuation of application No. PCT/CN2011/078213, filed on Aug. 10, 2011.

(51) Int. Cl.
*G06F 1/26* (2006.01)
*G06F 1/32* (2006.01)
*H04W 4/20* (2009.01)
*H04W 52/02* (2009.01)
(Continued)

(52) U.S. Cl.
CPC ......... *G06F 1/3209* (2013.01); *H04L 41/0833* (2013.01); *H04L 41/50* (2013.01); *H04L 67/1095* (2013.01); *H04L 67/2861* (2013.01); *H04W 4/20* (2013.01); *H04W 52/0235* (2013.01); *G06F 1/3203* (2013.01); *H04W 52/0216* (2013.01); *Y02B 60/50* (2013.01)

(58) Field of Classification Search
CPC ..................... H04L 67/1095; H04W 52/0235
USPC ........................................................ 713/310
See application file for complete search history.

(56) References Cited

U.S. PATENT DOCUMENTS 5,752,201 A * 5/1998 Kivari ............... H04W 52/0229
455/574
8,432,920 B2 * 4/2013 Yee ....................... H04W 88/06
370/395.2
(Continued)

FOREIGN PATENT DOCUMENTS

CN 101110701 A 1/2008
CN 101194471 A 6/2008
(Continued)

*Primary Examiner* — Chun Cao
*Assistant Examiner* — Volvick Derose
(74) *Attorney, Agent, or Firm* — Leydig, Voit & Mayer, Ltd.

(57) ABSTRACT

The embodiments of the present disclosure provide a method, a device and a system for data stream transmission, which relate to the field of communication, and can reduce the energy consumption of the data stream transmission between devices. The method includes: receiving, by a resting device, a message indicating to enter into an energy-saving state; after receiving the message indicating to enter into the energy-saving state, sending, by the resting device, stored user information to an on-duty device so that the on-duty device receives and synchronizes user information; and, after the user information is synchronized, setting, by the resting device, the transmission state of the resting device as standby and entering into a sleeping state. The embodiments of the present disclosure are used for data stream transmission.

21 Claims, 9 Drawing Sheets

(51) Int. Cl.
*H04L 29/08* (2006.01)
*H04L 12/24* (2006.01)

(56) References Cited

U.S. PATENT DOCUMENTS

| | | | |
|---|---|---|---|
| 9,140,547 B2* | 9/2015 | Woollett | G01B 21/047 |
| 2002/0174371 A1* | 11/2002 | Padawer | G06F 1/3203 |
| | | | 713/320 |
| 2004/0057509 A1* | 3/2004 | Porat | H04L 12/12 |
| | | | 375/222 |
| 2005/0138451 A1 | 6/2005 | Simpson et al. | |
| 2005/0232200 A1 | 10/2005 | Jeong et al. | |
| 2005/0233780 A1* | 10/2005 | Jani | H04W 52/0229 |
| | | | 455/574 |
| 2005/0249113 A1* | 11/2005 | Kobayashi | H04L 45/586 |
| | | | 370/219 |
| 2008/0069047 A1* | 3/2008 | Yee | H04W 88/06 |
| | | | 370/331 |
| 2008/0219228 A1 | 9/2008 | Seok et al. | |
| 2009/0086798 A1* | 4/2009 | Zukunft | H04L 12/10 |
| | | | 375/222 |
| 2009/0209272 A1* | 8/2009 | Palanki | H04W 52/0235 |
| | | | 455/458 |
| 2010/0141399 A1 | 6/2010 | Swope | |
| 2010/0182926 A1 | 7/2010 | Kubota | |
| 2011/0244792 A1* | 10/2011 | Park | H04W 52/0216 |
| | | | 455/39 |
| 2012/0113799 A1 | 5/2012 | Chen et al. | |
| 2012/0204058 A1* | 8/2012 | Yuan | H04L 41/0663 |
| | | | 714/4.11 |
| 2013/0034355 A1* | 2/2013 | Zhang | H04Q 11/0067 |
| | | | 398/67 |

FOREIGN PATENT DOCUMENTS

| | | |
|---|---|---|
| CN | 101651553 A | 2/2010 |
| CN | 101675625 A | 3/2010 |
| EP | 2139155 A1 | 6/2008 |
| JP | 2007318263 A | 12/2007 |
| JP | 2010141617 A | 6/2010 |
| JP | 2010171479 A | 8/2010 |
| WO | WO 0045559 A1 | 8/2000 |

* cited by examiner

Fig.11

METHOD, DEVICE AND SYSTEM FOR DATA STREAM TRANSMISSION

CROSS-REFERENCE TO RELATED APPLICATIONS

This application is a continuation of International Patent Application No. PCT/CN2011/078213, filed on Aug. 10, 2011, which is hereby incorporated by reference in its entirety.

TECHNICAL FIELD

The present disclosure relates to the field of communication, and particularly, to a method, a device and a system for data stream transmission.

BACKGROUND

The Broadband Remote Access Server (Broadband Remote Access Server, BRAS) is a new-type access gateway oriented to the broadband network application. It is located in the edge layer of backbone network, and capable of completing the data access of the Internet Protocol (Internet Protocol, IP)/Asynchronous Transfer Mode (Asynchronous Transfer Mode, ATM) network for the user bandwidth, thereby realizing applications such as broadband Internet for commercial buildings and village residents, IP Security Protocol (IP Security Protocol, IPSec)-based IP Virtual Private Network (IP Virtual Private Network, IP VPN) service, Intranet construction, and support to the Internet Service Provider (ISP) to wholesale services to the users.

Currently, there are often multiple BRASs to simultaneously provide the user with the data stream transmission service, without considering various scenarios of data traffic change during the data stream transmission.

The inventors find that the energy consumption during the data stream transmission of the BRAS is not considered in the prior art.

SUMMARY

The embodiments of the present disclosure provide a method, a device and a system for data stream transmission, which can reduce the energy consumption of the data stream transmission between devices.

An aspect provides a method for data stream transmission, including:
receiving a message indicating to enter into an energy-saving state;
after receiving the message indicating to enter into the energy-saving state, sending stored user information to an on-duty device, wherein the on-duty device receives and synchronizes the user information; and
after the user information is synchronized, setting transmission state as standby and entering into a sleeping state.

Another aspect further provides a method for data stream transmission, including:
receiving a message indicating to enter into an energy-saving state;
after receiving the message indicating to enter into the energy-saving state, receiving and synchronizing user information sent by a resting device; and
after the user information is synchronized, setting transmission state as main and performing a data stream switching.

Another aspect provides a resting device for data transmission, including:

a receiving unit configured to receive a message indicating to enter into an energy-saving state;
a synchronizing unit configured to send stored user information to an on-duty device for data transmission so that the on-duty device for data transmission receives and synchronizes user information, after the receiving unit receives the message indicating to enter into the energy-saving state; and
a setting unit configured to set transmission state as standby and enters the sleeping state, after the user information is synchronized.

Another aspect provides an on-duty device for data transmission, including:
a receiving unit configured to receive a message indicating to enter into an energy-saving state;
a synchronizing unit configured to receive and synchronize user information sent by a resting device for data transmission, after the receiving unit receives the message indicating to enter into the energy-saving state; and
a setting unit configured to set transmission state as main and perform a data stream switching, after the user information is synchronized.

Another aspect provides a system for data stream transmission, including:
a resting device for data transmission configured to receive a message indicating to enter into an energy-saving state; send stored user information to an on-duty device for data transmission after receiving the message indicating to enter into the energy-saving state; and set transmission state of the resting device as standby and enter into a sleeping state, after the user information is synchronized;
the on-duty device for data transmission configured to receive a message indicating to enter into the energy-saving state; receive and synchronize the user information sent by the resting device for data transmission, after receiving the message indicating to enter into the energy-saving state; and set the transmission state of the on-duty device as main and perform a data stream switching, after the user information is synchronized; and
a network management device configured to detect the network traffic, send the messages indicating to enter into the energy-saving state to the resting device for data transmission, and send the messages indicating to enter into the energy-saving state to the on-duty device for data transmission.

The embodiments of the present disclosure provide a method, a device and a system for data stream transmission, wherein after the message indicating to enter into the energy-saving state is received, the resting device sends stored user information to the on-duty device so that the on-duty device receives and synchronizes user information; and after the user information is synchronized, the resting device sets the transmission state of itself as standby and enters into the sleeping state, while the on-duty device sets the transmission state of itself as main and switches the data stream. Thus, after the user information is synchronized between the devices, one (group of) device enters into the sleeping state and the other keeps the normal working state, thereby reducing the energy consumption in the data stream transmission between the devices.

BRIEF DESCRIPTION OF THE DRAWINGS

In order to more clearly describe the technical solutions of the embodiments of the present disclosure or the prior art, the drawings to be used in the descriptions of the embodiments or the prior art are briefly introduced as follows. The following drawings just illustrate some embodiments of the present disclosure, and a person skilled in the art can obtain other drawings from these drawings without paying a creative effort.

DESCRIPTION OF EMBODIMENTS

The technical solutions of the embodiments of the present disclosure will be clearly and completely described as follows with reference to the drawings. The described embodiments are just a part of embodiments of the present disclosure rather than all the embodiments. Based on the embodiments of the present disclosure, any other embodiment obtained by a person skilled in the art without paying a creative effort shall fall within the protection scope of the present disclosure.

In the embodiments of the present disclosure, a device in the working state after the data stream switching is defined as an on-duty device, while a device in the sleeping state after the data stream switching is defined as a resting device.

Figure 1:
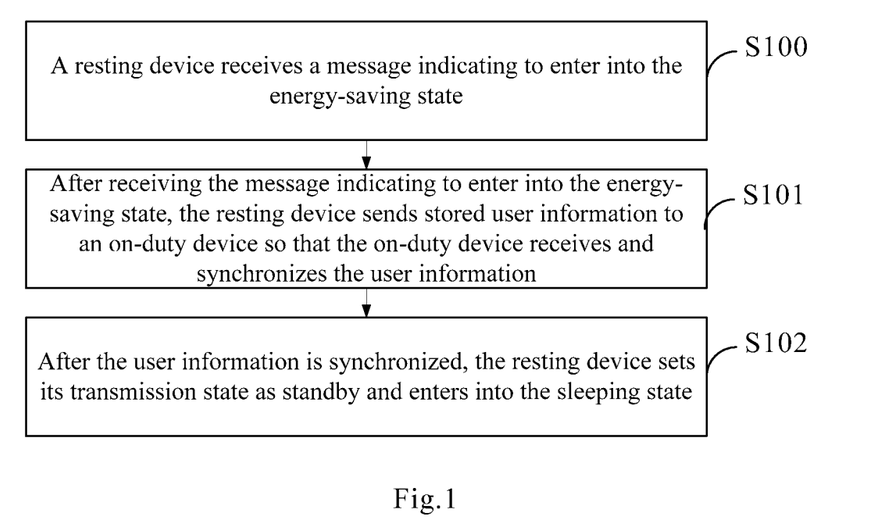
FIG. 1 is a flowchart of a method for data stream transmission provided by an embodiment of the present disclosure.

A method for data stream transmission provided by an embodiment of the present disclosure is illustrated in FIG. 1, including the following steps.

In step S100, a resting device receives a message indicating to enter into the energy-saving state.

Herein, the message indicating to enter into the energy-saving state may be sent by a network management device.

In step S101, after receiving the message indicating to enter into the energy-saving state, the resting device sends stored the user information to an on-duty device so that the on-duty device receives and synchronizes the user information.

In step S102, after the user information is synchronized, the resting device sets the transmission state of itself as standby and enters into the sleeping state.

For example, the resting device may set the device priority as low according to the Virtual Router Redundancy Protocol of itself, so as to set the transmission state of itself as standby.

In the method for data stream transmission provided by the embodiment of the present disclosure, after receiving the message indicating to enter the energy-saving state, the resting device sends stored user information to the on-duty device so that the on-duty device receives and synchronizes the user information; and after the user information is synchronized, the resting device sets transmission state of itself as standby and enters into the sleeping state, while the on-duty device sets the transmission state of itself as main and switches the data stream. Thus, after the user information is synchronized between the devices, one (group of) device enters into the sleeping state and the other keeps the normal working state, thereby reducing the energy consumption during the data stream transmission between the devices.

Figure 2:
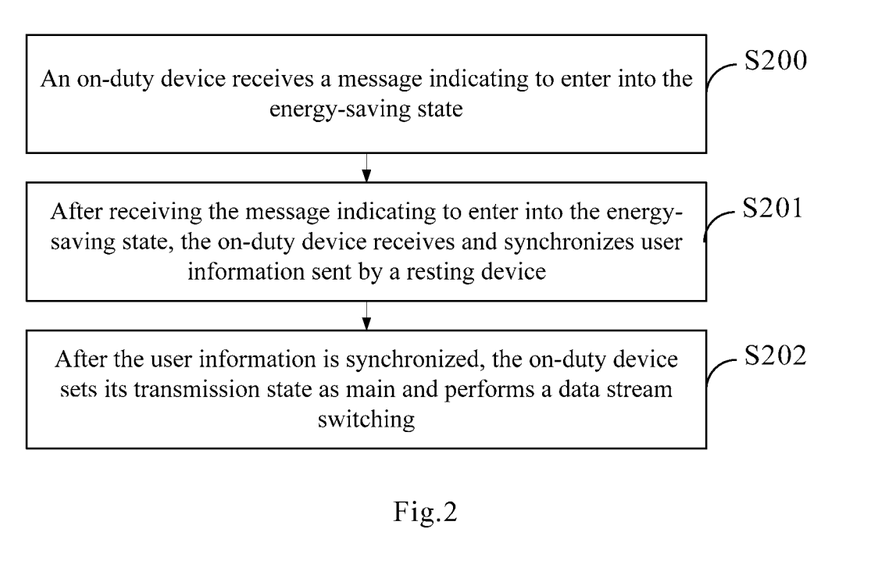
FIG. 2 is a flowchart of a method for data stream transmission provided by another embodiment of the present disclosure.

A method for data stream transmission provided by another embodiment of the present disclosure is illustrated in FIG. 2, including the following steps.

In step S200, an on-duty device receives a message indicating to enter into the energy-saving state.

Herein, the message indicating to enter into the energy-saving state may be sent by a network management device.

In step S201, after receiving the message indicating to enter into the energy-saving state, the on-duty device receives and synchronizes the user information sent by a resting device.

In step S202, after the user information is synchronized, the on-duty device sets the transmission state of itself as main and performs a data stream switching.

For example, the on-duty device distributes a routing to the upstream device, to trigger the data stream switching. The on-duty device may set the device priority as high according to the Virtual Router Redundancy Protocol (Virtual Router Redundancy Protocol, VRRP) of itself, so as to set the transmission state of itself as main, and send Address Resolution Protocol (Address Resolution Protocol, ARP) packets to the downstream device.

In this embodiment, either the on-duty device or the resting device may be a Broadband Remote Access Server (Broadband Remote Access Server, BRAS).

In the method for data stream transmission provided by the embodiment of the present disclosure, after the on-duty device receives the message indicating to enter into the energy-saving state, the resting device sends the stored user information to the on-duty device so that the on-duty device receives and synchronizes the user information; and after the user information is synchronized, the resting device sets the transmission state of itself as standby and enters into the sleeping state, while the on-duty device sets the transmission state of itself as main and switches the data stream. Thus, after the user information is synchronized between the devices, one (group of) device enters into the sleeping state and the other keeps the normal working state, thereby reducing the energy consumption during the data stream transmission between the devices.

Figure 3:
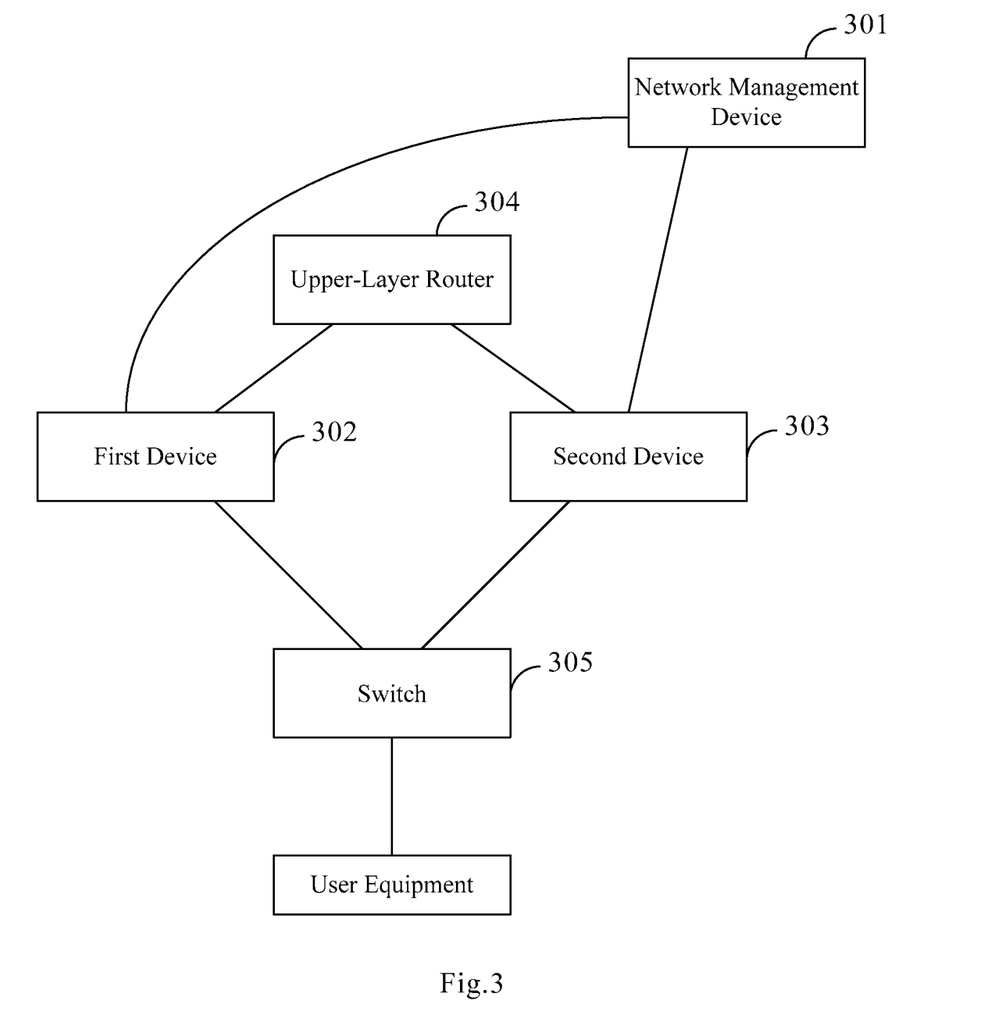
FIG. 3 is a structure diagram of a system for data stream transmission provided by an embodiment of the present disclosure.

A method for data stream transmission provided by still another embodiment of the present disclosure is described with reference to FIGS. 3 and 4 through the examples of two devices for data stream transmission. As illustrated in FIG. 3, a network management device 301 is connected to a first device 302 and a second device 303 used as transmission devices, respectively. An upstream device 304 (e.g., an upper-layer router) is connected to the first device 302 and the second device 303, respectively. The first device 302 and the second device 303 are further connected to a downstream device 305 (e.g., a switch), respectively. In this embodiment, either the first device 302 or the second device 303 may be the BRAS.

Figure 4:
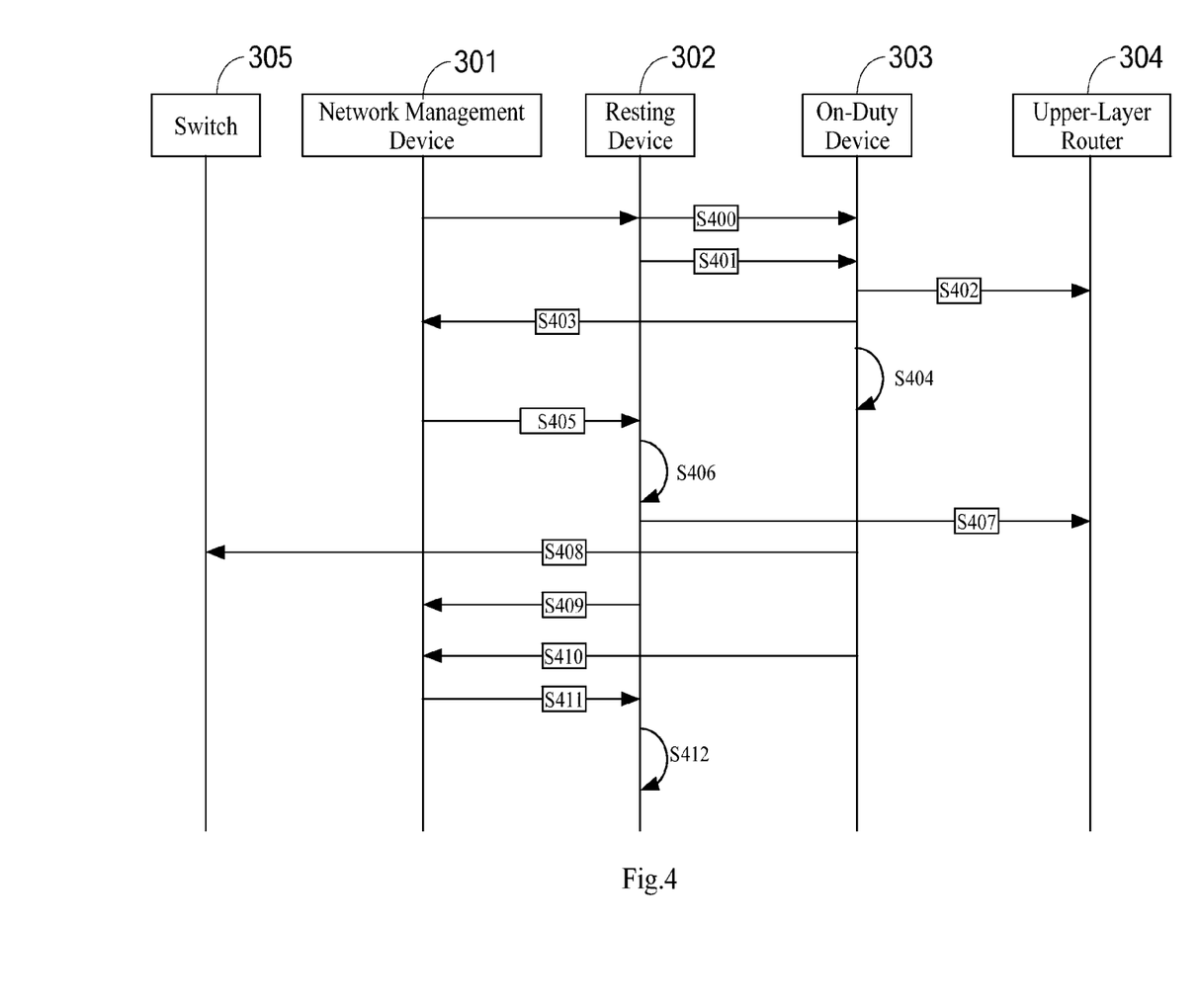
FIG. 4 is a process diagram of entering into the energy-saving state in a method for data stream transmission provided by an embodiment of the present disclosure.

As illustrated in FIG. 4, this embodiment includes the following steps.

In S400, the network management device 301 sends a message indicating to enter into the energy-saving state to the first device 302 and the second device 303 which are used as devices for data stream transmission. In this embodiment, it may be pre-assigned that the first device 302 is the resting device and the second device 303 is the on-duty device.

Herein, the network management device 301 may periodically send the message indicating to enter into the energy-saving state to the first device 302 and the second device 303; or detect the data traffic in the network, and send the message indicating to enter into the energy-saving state to the first device 302 and the second device 303 when the data traffic meets the predetermined condition.

In S401, after receiving the message indicating to enter into the energy-saving state sent by the network management device 301, the resting device 302 sends the user information stored by itself to the on-duty device 303 that receives and synchronizes the user information.

In S402, after receiving and synchronizing the user information sent by the resting device 302, the on-duty device 303 distributes a user side routing to the upper-layer router 304 which is used as the upstream device, so as to perform the data stream switching.

In S403, the on-duty device 303 sends a user information synchronization completed message to the network management device 301.

In S404, after synchronizing the user information, the on-duty device 303 sets the device priority as high according to its VRRP, so as to set the transmission state of itself as main.

In S405, the network management device 301 sends a message indicating to start switching to the resting device 302.

In S406, after receiving the message indicating to start switching sent by the network management device, the resting device 302 sets the device priority as low according to its VRRP, so as to set the transmission state of itself as standby.

In S407, after setting the transmission state of itself as standby, the resting device 302 sends a message of canceling user side routing to the upper-layer router 304.

In S408, while the resting device 302 sends the message of canceling user side routing to the upper-layer router 304, the on-duty device 303 sends ARP packets to the switch 305 which is used as the downstream device.

In S409, after sending the message of canceling user side routing to the upper-layer router 304, the resting device 302 sends a switching completion message to the network management device 301.

In S410, after sending the ARP packets to the switch 305, the on-duty device 303 sends a switching completion message to the network management device 301.

In S411, after receiving the switching completion messages sent by the resting device 302 and the on-duty device 303, respectively, the network management device 301 sends a sleeping instruction to the resting device 302.

In S412, after receiving the sleeping instruction, the resting device 302 enters into the sleeping state. Further, the interface board of the resting device may be powered off.

In the method for data stream transmission provided by the embodiment of the present disclosure, after receiving the message indicating to enter into the energy-saving state, the resting device sends the stored user information to the on-duty device so that the on-duty device receives and synchronizes the user information; and after the user information is synchronized, the resting device sets the transmission state of itself as standby and enters into the sleeping state, while the on-duty device sets the transmission state of itself as main and switches the data stream. Thus, after the user information is synchronized between the devices, one device enters into the sleeping state and the other keeps the normal working state, thereby reducing the energy consumption in the data stream transmission between the devices.

Figure 5:
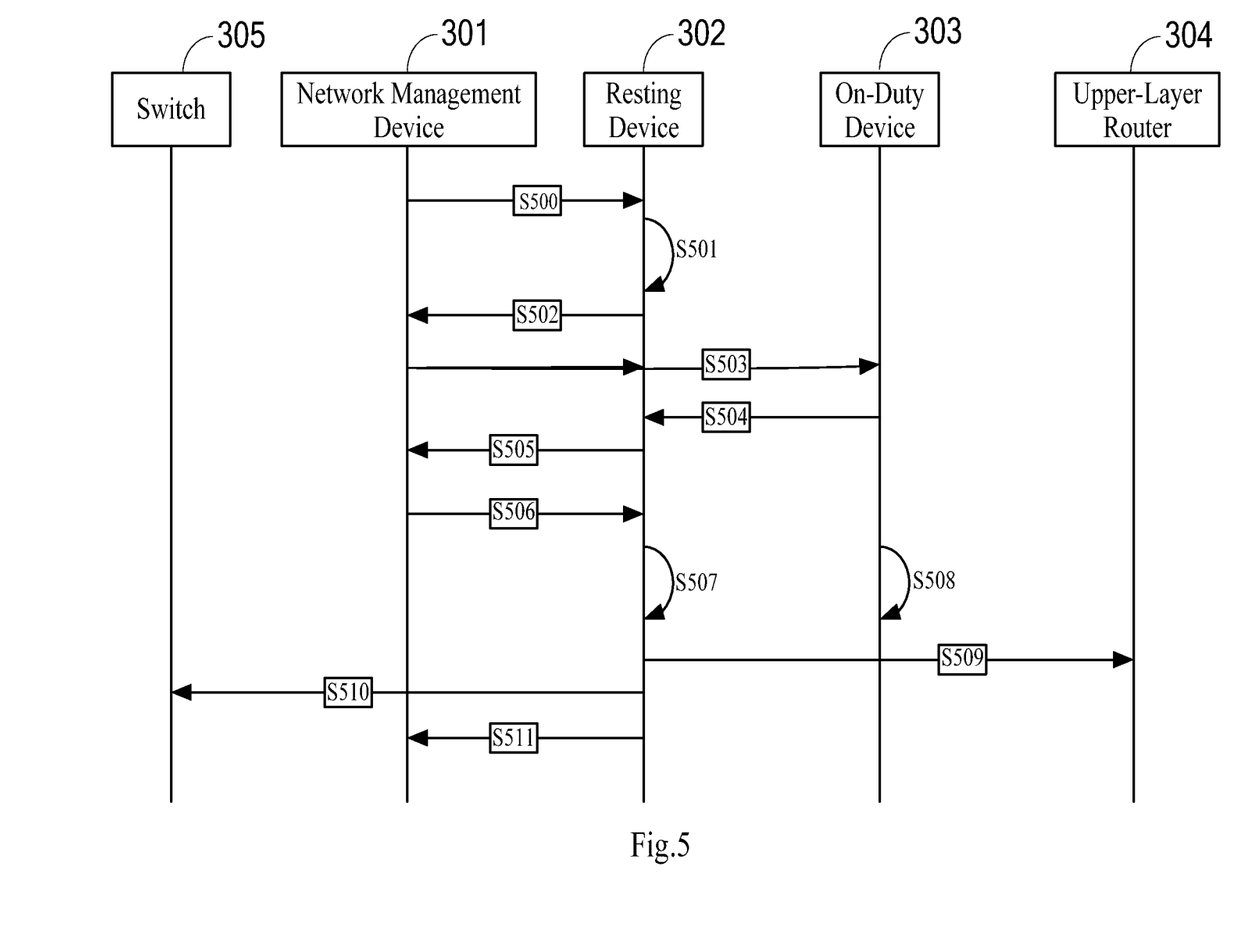
FIG. 5 is a process diagram of recovery in a method for data stream transmission provided by an embodiment of the present disclosure.

Further, when the energy-saving state expires or the network management device detects that the data traffic in the network meets the predetermined condition, the resting device in the sleeping state shall be awoken to recover the working state. As illustrated in FIG. 5, this embodiment includes the following state.

In S500, the network management device 301 sends a recovery indication message to the resting device 302.

In S501, after receiving the recovery indication message, the resting device 302 recovers the related configuration information.

In S502, after recovering the related configuration information, the resting device 302 sends a recovery completion message to the network management device 301.

In S503, the network management device 301 sends a user information synchronization instruction to the resting device 302 and the on-duty device 303.

In S504, after receiving the user information synchronization instruction sent by the network management device 301, the on-duty device 303 sends the user information stored by itself to the resting device 302; and after receiving the user information synchronization instruction sent by the network management device 301, the resting device 302 receives and synchronizes the user information sent by the on-duty device 303.

In S505, after synchronizing the user information sent by the on-duty device 303, the resting device 302 sends a synchronization completion message to the network management device 301.

In S506, after receiving the synchronization completion message sent by the resting device 302, the network management device 301 sends a message indicating to start switching to the resting device 302.

In S507, after receiving the message indicating to start switching sent by the network management device 301, the resting device 302 sets the device priority as high according to its VRRP, so as to set the transmission state of itself as main.

In S508, the on-duty device 303 sets the device priority as low according to its VRRP, so as to set the transmission state of itself as standby. To be noted, S508 is performed after step S504 where the on-duty device 303 sends the user information to the resting device 302, while not limited to be performed after S507.

In S509, after setting the transmission state of itself as main, the resting device 302 distributes a user side routing to the upper-layer router 304, so as to perform the data stream switching.

In S510, while distributing the user side routing to the upper-layer router 304, the resting device 302 sends ARP packets to the switch 305.

In S511, after distributing the user side routing to the upper-layer router 304 and sending the ARP packets to the switch 305, the resting device 302 sends a switching completion message to the network management device 301.

Thus, the sleeping resting device may be awoken by the network management device to recover the working state, thereby ensuring normal data stream transmission.

In addition, when the system enters into the energy-saving state, the communication link between the resting device and the network management device shall not be closed, so as to ensure that the resting device can recover the working state in time.

Figure 6:
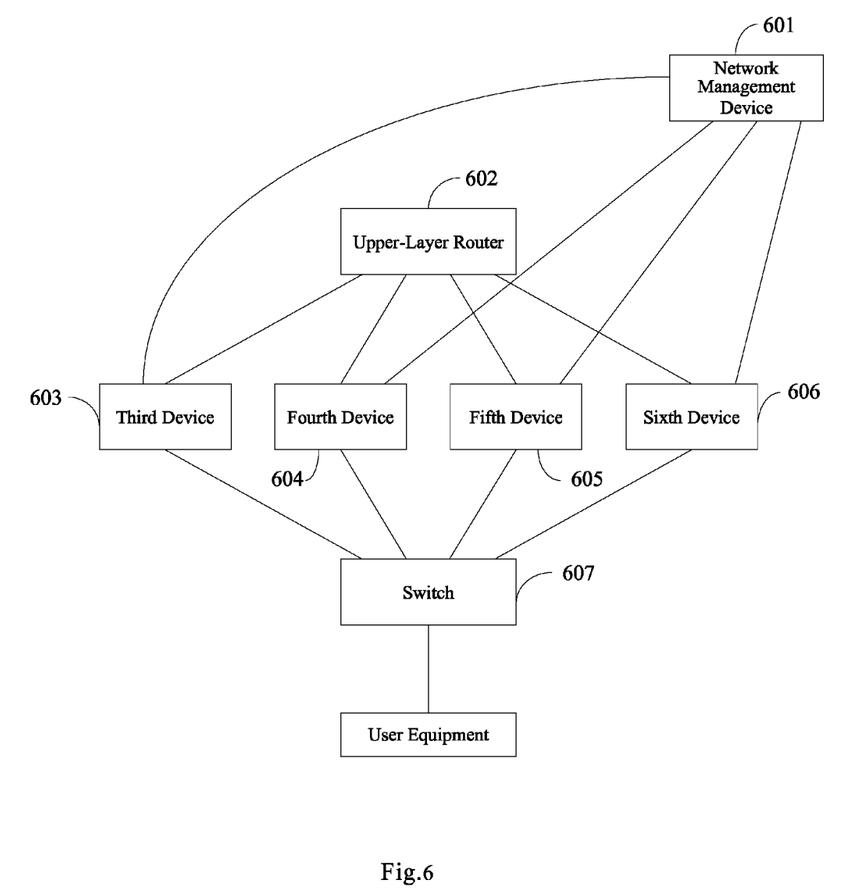
FIG. 6 is a structure diagram of another system for data stream transmission provided by an embodiment of the present disclosure.

A method for data stream transmission provided by another embodiment of the present disclosure is described with reference to FIGS. 6 and 7 through the examples of four data streams in two groups. As illustrated in FIG. 6, a network management device 601 is connected to a third device 603, a fourth device 604, a fifth device 605 and a sixth device 606 which are used as devices for data stream transmission, respectively. An upstream device 602 (e.g., an upper-layer router) is connected to the third device 603, the fourth device 604, the fifth device 605 and the sixth device 606, respectively. The third device 603, the fourth device 604, the fifth device 605 and the sixth device 606 are further connected to a downstream device 607 (e.g., a switch), respectively. In this embodiment, any of the third device 603, the fourth device 604, the fifth device 605 and the sixth device 606 may be the BRAS.

In this embodiment, it may be pre-assigned that the third device 603 and the fourth device 604 are resting devices, wherein the third device 603 is a main resting device and the fourth device 604 is a standby resting device; the fifth device 605 and the sixth device 606 are on-duty devices, wherein the fifth device 605 is a main on-duty device and the sixth device 606 is a standby on-duty device.

Figure 7:
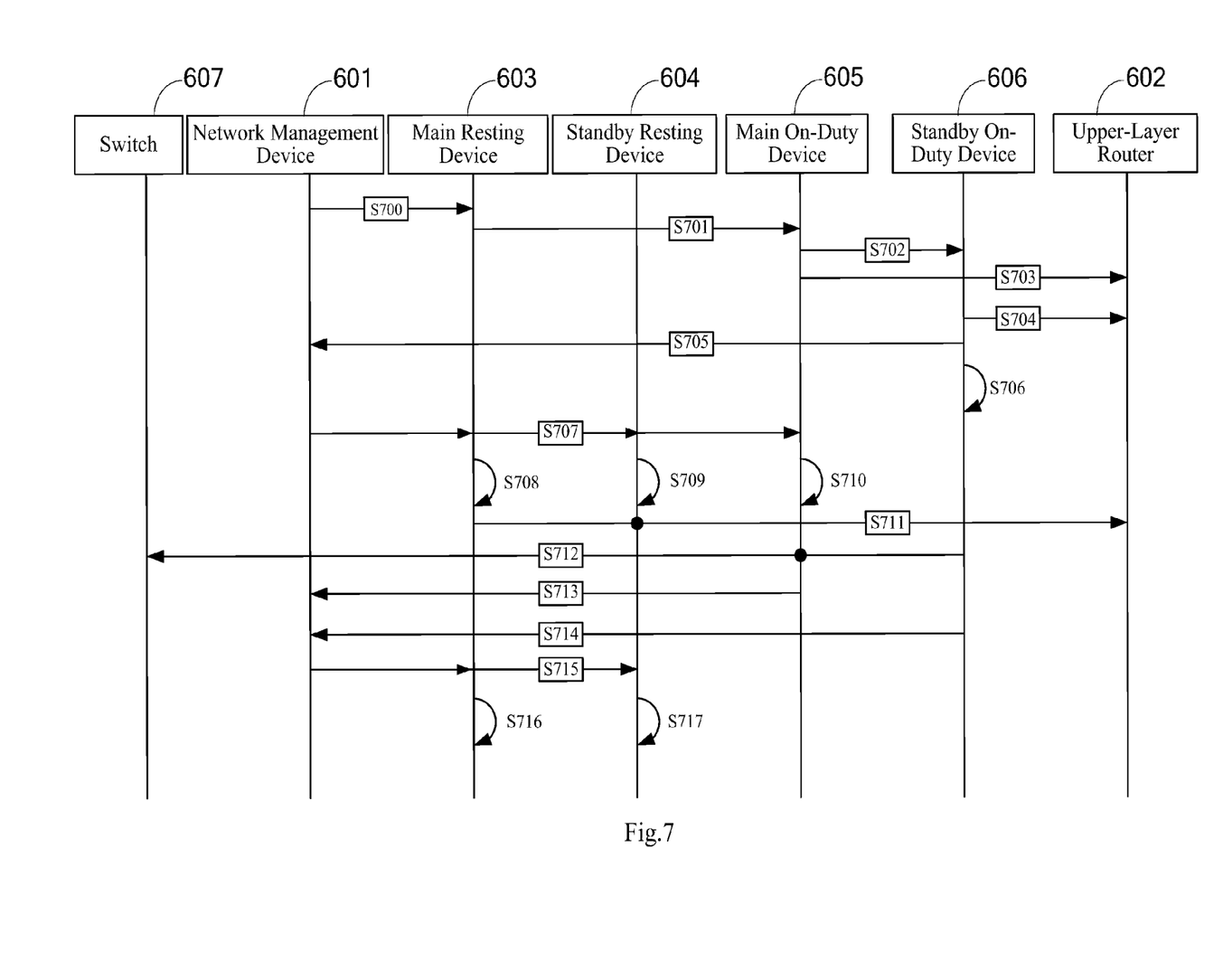
FIG. 7 is another process diagram of entering into the energy-saving state in a method for data stream transmission provided by an embodiment of the present disclosure.

As illustrated in FIG. 7, this embodiment includes the following steps.

In S700, the network management device 601 sends a message indicating to enter into the energy-saving state to the main resting device 603.

Herein, the network management device 601 may periodically send the message indicating to enter into the energy-saving state to the main resting device 603, or detect the data traffic in the network, and send the message indicating to enter the energy-saving state to the main resting device 603 when the data traffic meets the predetermined condition.

In S701, after receiving the message indicating to enter into the energy-saving state sent by the network management device 601, the main resting device 603 sends the stored user information to the main on-duty device 605 that receives and synchronizes the user information.

In S702, after receiving and synchronizing the user information sent by the main resting device 603, the main on-duty device 605 sends the user information to the standby on-duty device 606 that receives and synchronizes the user information.

In S703, after the standby on-duty device 606 receives and synchronizes the user information, the main on-duty device 605 distributes a user side routing to the upper-layer router 602 which is used as the upstream device, so as to perform a data stream switching.

In S704, while the main on-duty device 605 distributes the user side routing to the upper-layer router 602, the standby on-duty device 606 also distributes a user side routing to the upper-layer router 602, so as to perform a data stream switching.

In S705, after the main on-duty device 605 and the standby on-duty device 606 distribute the user side routing to the upper-layer router 602, the standby on-duty device 606 sends a user information synchronization completion message to the network management device 601.

In S706, after sending the user information synchronization completion message to the network management device 601, the standby on-duty device 606 sets the device priority as low according to its VRRP, so as to set the transmission state of itself as standby.

In S707, the network management device 601 sends a message indicating to start switching to the main resting device 603, the standby resting device 604 and the main on-duty device 605.

In S708, after receiving the message indicating to start switching sent by the network management device 601, the main resting device 603 sets the device priority as low according to its VRRP, so as to set the transmission state of itself as standby.

In S709, after receiving the message indicating to start switching sent by the network management device 601, the standby resting device 604 sets the device priority as low according to its VRRP, so as to set the transmission state of itself as standby.

In S710, after receiving the message indicating to start switching sent by the network management device 601, the main on-duty device 605 sets the device priority as high according to its VRRP, so as to set the transmission state of itself as main.

In S711, after switching their transmission states, the main resting device 603 and the standby resting device 604 send messages of cancelling user side routing to the upper-layer router 602.

In S712, after switching their transmission states, the main on-duty device 605 and the standby on-duty device 606 send ARP packets to the switch 607.

In S713, after sending the ARP packets to the switch 607, the main on-duty device 605 sends a switching completion message to the network management device 601.

In S714, after sending the ARP packets to the switch 607, the standby on-duty device 606 sends a switching completion message to the network management device 601.

In S715, after receiving the switching completion messages sent by the main on-duty device 605 and the standby on-duty device 606, the network management device 601 sends a sleeping instruction to the main resting device 603 and the standby resting device 604.

In S716, after receiving the sleeping instruction, the main resting device 603 enters into the sleeping state. Further, the main resting device 603 may be powered off.

In S717, after receiving the sleeping instruction, the standby resting device 604 enters into the sleeping state. Further, the standby resting device 604 may be powered off.

In this embodiment, the process of user information synchronization between the resting devices and the on-duty devices may further include: the main resting device sends the stored user information to the main on-duty device, and the standby resting device sends the stored user information to the standby on-duty device; or, the main resting device sends the stored user information to the main on-duty device, and the main resting device sends the stored user information to the standby on-duty device.

However, considering the practical applications, in order to prevent the information of the main and standby on-duty devices being inconsistent with each other and improve the information reliability, it would be better to employ the synchronization mode that the main resting device sends the stored user information to the main on-duty device, and then the main on-duty device synchronizes the user information with the standby on-duty device.

In the method for data stream transmission provided by the embodiment of the present disclosure, after receiving the message indicating to enter into the energy-saving state, the resting devices send the stored user information to the on-duty devices so that the on-duty devices receives and synchronizes the user information; and after the user information is synchronized, the resting devices set the transmission state as standby and enter into the sleeping state, while the on-duty devices set the transmission state as main and switches the data stream. Thus, after the user information is synchronized between the devices, one group of devices enters into the sleeping state and the other keeps the normal working state, thereby reducing the energy consumption in the data stream transmission between the devices. Meanwhile, since each group consists of two devices for data stream transmission, the reliability of data stream transmission of the on-duty devices is ensured by the hot-standby mechanism.

Figure 8:
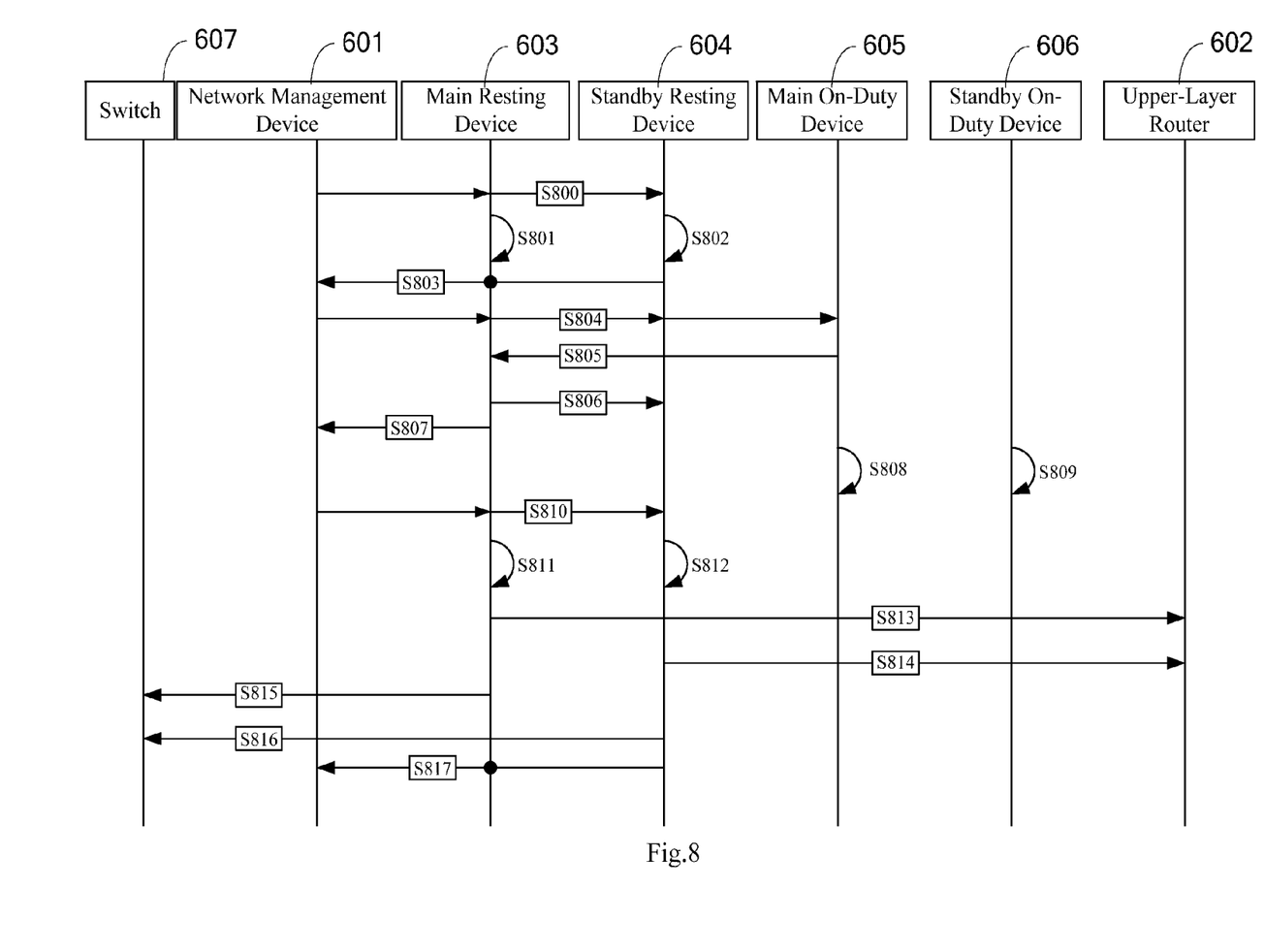
FIG. 8 is another process diagram of recovery in a method for data stream transmission provided by an embodiment of the present disclosure.

Further, when the energy-saving state expires or the network management device detects that the data traffic in the network meets the predetermined condition, the resting devices in the sleeping state shall be awoken to recover the working state. As illustrated in FIG. 8, this embodiment includes the following steps.

In S800, the network management device 601 sends a recovery indication message to the main resting device 603 and the standby resting device 604.

In S801: after receiving the recovery indication message sent by the network management device 601, the main resting device 603 recovers the related configuration information.

In S802: after receiving the recovery indication message sent by the network management device 601, the standby resting device 604 recovers the related configuration information.

In S803: after recovering the related configuration information, the main resting device 603 and the standby resting device 604 send recovery completion messages to the network management device 601.

In S804: after receiving the recovery completion messages sent by the main resting device 603 and the standby resting device 604, the network management device 601 sends a user information synchronization instruction to the main resting device 603, the standby resting device 604 and the main on-duty device 605.

In S805: after receiving the user information synchronization instruction sent by the network management device 601, the main on-duty device 605 sends the stored user information to the main resting device 603 so that the main resting device 603 receives and synchronizes the user information.

In S806: after receiving and synchronizing the user information sent by the main on-duty device 605, the main resting device 603 sends the user information to the standby resting device 604 so that the standby resting device 604 receives and synchronizes the user information.

In S807: after the standby resting device 604 receives and synchronizes the user information, the main resting device 603 sends a synchronization completion message to the network management device 601.

In S808: after receiving the user information synchronization instruction sent by the network management device 601, the main on-duty device 605 sets the device priority as low according to its VRRP, so as to set the transmission state of itself as standby.

In S809: the standby on-duty device 606 sets the device priority as low according to its VRRP, so as to set the transmission state of itself as standby.

In S810: after receiving the synchronization completion message sent by the main resting device 603, the network management device 601 sends a message indicating to start switching to the main resting device 603 and the standby resting device 604.

In S811: after receiving the message indicating to start switching sent by the network management device 601, the main resting device 603 sets the device priority as high according to its VRRP, so as to set the transmission state of itself as main.

In S812: after receiving the message indicating to start switching sent by the network management device 601, the standby resting device 604 sets the device priority as low according to its VRRP, so as to set the transmission state of itself as standby.

In S813: after switching its transmission state, the main resting device 603 distributes a user side routing to the upper-layer router 602 which is used as the upstream device, so as to perform a data stream switching.

In S814: after switching its transmission state, the standby resting device 604 distributes a user side routing to the upper-layer router 602 so as to perform a data stream switching.

In S815: while distributing the user side routing to the upper-layer router 602, the main resting device 603 sends ARP packets to a switch 607 which is used as the downstream device.

In S816: while distributing the user side routing to the upper-layer router 602, the standby resting device 604 sends ARP packets to the switch 607.

In S817: after distributing the user side routings to the upper-layer router 602 and sending the ARP packets to the switch 607, the main resting device 603 and the standby resting device 604 send switching completion messages to the network management device 601.

Thus, the sleeping resting devices may be awoken by the network management device to recover the working state, thereby ensuring normal data stream transmission.

In addition, when the system enters into the energy-saving state, the communication link between the network management device and the main and standby resting devices shall not be closed, so as to ensure that the resting devices can recover the working state in time.

In this embodiment, the process of user information synchronization may further include: the main resting device receives and synchronizes the user information stored by the main on-duty device, and the standby resting device receives and synchronizes the user information stored by the standby on-duty device. Or, the main resting device receives and synchronizes the user information stored by the main on-duty device, and the standby on-duty device receives and synchronizes the user information stored by the main on-duty device. However, considering the practical applications, in order to prevent the information of the main and standby on-duty devices being inconsistent with each other and improve the information reliability, it would be better to employ the synchronization mode that the main resting device receives and synchronizes the user information stored by the main on-duty device, and then the main resting device synchronizes the user information with the standby resting device.

During the process of data stream transmission by each device in this embodiment, the network management device may notify each device to perform the data stream transmission according to the state of each device and the condition of the information synchronization, until the information synchronizations between all the devices in the running state are completed. Or, multiple devices in the working group interact with each other to judge the progress of the information synchronizations, and respectively perform a switching after all the synchronizations are completed. However, considering the practical applications, in order that the network management device uniformly performs the monitoring and uniformly triggers the switching, it would be better to employ the network management device to notify each device to perform the data stream transmission according to the state of each device and the condition of the information synchronization, until the information synchronizations between all the devices in the running state are completed.

Figure 9:
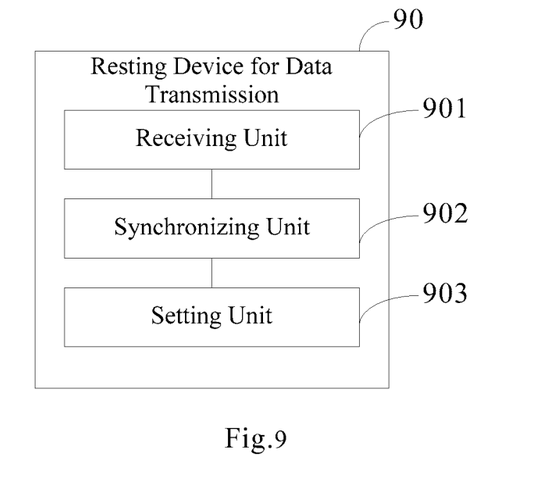
FIG. 9 is a structure diagram of a resting device for data transmission provided by an embodiment of the present disclosure.

A device 90 for resting data transmission provided by an embodiment of the present disclosure is illustrated in FIG. 9, including a receiving unit 900, a synchronizing unit 901 and a setting unit 902.

The receiving unit 900 is configured to receive a message indicating to enter into the energy-saving state.

The synchronizing unit 901 is configured to send the stored user information to an on-duty device for data transmission so that the on-duty device for data transmission receives and synchronizes the user information, after the receiving unit 900 receives the message indicating to enter the energy-saving state.

The setting unit 902 is configured to set its transmission state as standby and enters into the sleeping state, after the user information is synchronized.

Further, the receiving unit 900 is also configured to receive a recovery indication message.

The synchronizing unit 901 is also configured to receive and synchronize the user information sent by the on-duty device for data transmission, after the receiving unit 900 receives the recovery indication message.

The setting unit 902 is also configured to set its transmission state as main and perform a data stream switching, after the user information is synchronized.

In this embodiment, the resting device for data transmission may be the BRAS.

The resting device for data transmission provided by the embodiment of the present disclosure receives the message indicating to enter into the energy-saving state, sends the stored user information to the on-duty device for data transmission, and after the user information is synchronized, sets its transmission state as standby and enters into the sleeping state. Thus, after the user information is synchronized between the devices, one (group of) device enters into the sleeping state and the other keeps the normal working state, thereby reducing the energy consumption in the data stream transmission between the devices. Moreover, the resting device for data transmission receives the recovery indication message, receives and synchronizes the user information sent by the on-duty device for data transmission, and after the user information is synchronized, sets its transmission state as main and performs a data stream switching. Thus the sleeping resting device for data transmission may be awoken by the network management device to recover the working state, thereby ensuring the normal data stream transmission.

Figure 10:
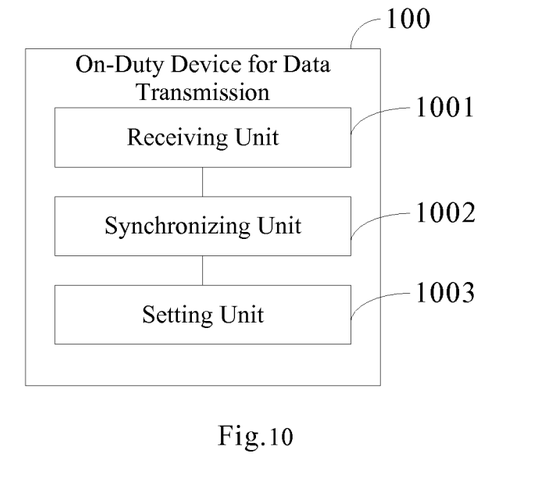
FIG. 10 is a structure diagram of an on-duty device for data transmission provided by an embodiment of the present disclosure.

A device 100 for on-duty data transmission provided by an embodiment of the present disclosure is illustrated in FIG. 10, including a receiving unit 1001, a synchronizing unit 1002, and a setting unit 1003.

The receiving unit 1001 is configured to receive a message indicating to enter into the energy-saving state.

The synchronizing unit 1002 is configured to receive and synchronize the user information sent by the resting device for data transmission, after the receiving unit 1001 receives the message indicating to enter into the energy-saving state.

The setting unit 1003 is configured to set its transmission state as main and perform a data stream switching, after the user information is synchronized.

Further, the receiving unit 1001 is also configured to receive a recovery indication message.

The synchronizing unit is also configured to send the stored user information to the resting device for data transmission after the receiving unit 1001 receives the recovery indication message, so that the resting device for data transmission receives and synchronizes the user information.

The synchronizing unit 1003 is also configured to set its transmission state as standby after the user information is synchronized.

In this embodiment, the on-duty device for data transmission may be the BRAS.

The on-duty device for data transmission provided by the embodiment of the present disclosure receives the message indicating to enter into the energy-saving state, receives and synchronizes the user information sent by the resting device for data transmission, and after the user information is synchronized, sets its transmission state as main and performs a data stream switching. Thus, after the user information is synchronized between the devices, one (group of) device enters into the sleeping state and the other keeps the normal working state, thereby reducing the energy consumption in the data stream transmission between the devices. Moreover, the on-duty device for data transmission receives the recovery indication message, sends the stored user information to the resting device for data transmission, and after the user information is synchronized, sets its transmission state as standby. Thus after being awoken, the sleeping resting device for data transmission recovers the working state in cooperation with the on-duty device for data transmission, thereby ensuring the normal data stream transmission.

Figure 11:
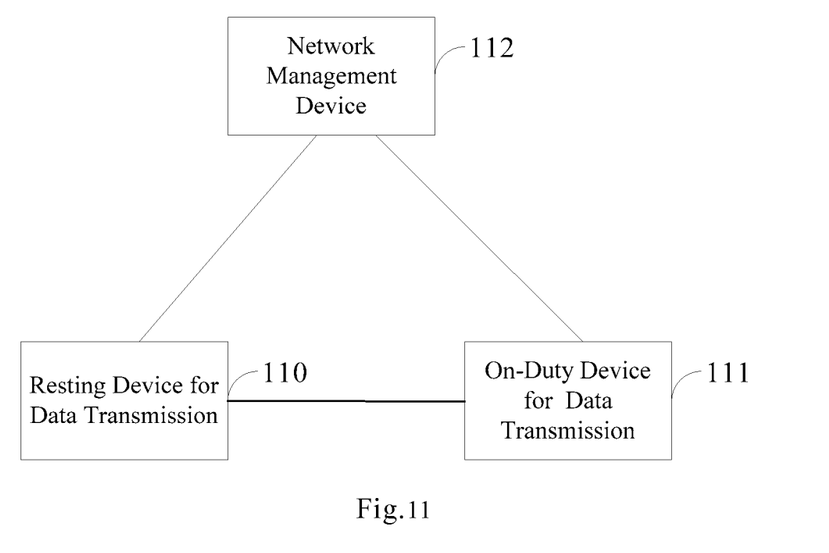
FIG. 11 is a structure diagram of a system for data stream transmission provided by an embodiment of the present disclosure.

A system for data stream transmission provided by an embodiment of the present disclosure is illustrated in FIG. 11, including a resting device for data transmission 110, an on-duty device for data transmission 111 and a network management device 112.

The device for resting data transmission 110 is configured to receive a message indicating to enter into the energy-saving state; send the stored user information to a device for on-duty data transmission 111 after receiving the message indicating to enter into the energy-saving state; and set its transmission state as standby and enter into the sleeping state, after the user information is synchronized.

The device for on-duty data transmission 111 is configured to receive a message indicating to enter into the energy-saving state; receive and synchronize the user information sent by the device for resting data transmission 110, after receiving the message indicating to enter into the energy-saving state; and set its transmission state as main and perform a data stream switching, after the user information is synchronized.

The network management device 112 is configured to detect the network traffic, and send the messages indicating to enter into the energy-saving state to the device for resting data transmission 110 and the device for on-duty data transmission 111.

Further, the device for resting data transmission 110 is also configured to receive a recovery indication message; receive and synchronize the user information sent by the device for on-duty data transmission 111, after receiving the recovery indication message; and set its transmission state as main and perform a data stream switching, after the user information is synchronized.

The device for on-duty data transmission 111 is also configured to receive a recovery indication message; send the stored user information to the device for resting data transmission 110 after receiving the recovery indication message, so that the device 110 for resting data transmission receives and synchronizes the user information; and set its transmission state as standby after the user information is synchronized.

The network management device 112 is also configured to detect the network traffic, and send the recovery indication messages to the device for resting data transmission 110 and the device for on-duty data transmission 111.

In this embodiment, the device for resting data transmission 110 and the device for on-duty data transmission 111 resting device for data transmission may be the BRAS.

In the system for data stream transmission provided by the embodiment of the present disclosure, the resting device for data transmission receives the message indicating to enter into the energy-saving state, sends the stored user information to the on-duty device for data transmission, and after the user information is synchronized, sets its transmission state as standby and enters into the sleeping state. Thus, after the user information is synchronized between the devices, one (group of) device enters the sleeping state and the other keeps the normal working state, thereby reducing the energy consumption in the data stream transmission between the devices.

Moreover, the resting device for data transmission receives the recovery indication message, receives and synchronizes the user information sent by the on-duty device for data transmission, and after the user information is synchronized, sets its transmission state as main and performs a data stream switching. Thus, the sleeping resting device for data transmission may be awoken by the network management device to recover the working state, thereby ensuring the normal data stream transmission.

The above descriptions are just some embodiments of the present disclosure, and the protection scope of the present disclosure is not limited thereto. Any change or replacement easily conceivable to a person skilled in the art within the technical scope disclosed by the present disclosure shall be covered by the protection scope of the present disclosure. Therefore, the protection scope of the present disclosure shall be determined by the protection scope of the claims.

The invention claimed is:

1. A method for data stream transmission, comprising:
   receiving, by a resting device, a message indicating to enter into an energy-saving state;
   after receiving the message indicating to enter into the energy-saving state, sending, by the resting device, stored user information to an on-duty device, wherein the on-duty device receives and synchronizes the user information; and
   after the user information is synchronized, setting, by the resting device, transmission state as standby and entering into a sleeping state, wherein a data stream switching is performed between the resting device and the on-duty device, and the on-duty device is a device in the working state after the data stream switching, while the resting device is a device in the sleeping state after the data stream switching,
   wherein after the user information is synchronized, the on-duty device sets transmission state as main and performs a data stream switching, wherein the on-duty device setting the transmission state as main and performing the data stream switching comprises: distributing a user's routing to an upstream device to trigger the data stream switching; setting the device priority as high according to a Virtual Router Redundancy Protocol of the device, so as to set the transmission state as main; and sending Address Resolution Protocol packets to a downstream device.

2. The method according to claim 1, wherein the message indicating to enter into the energy-saving state is sent by a network management device.

3. The method according to claim 1, wherein setting the transmission state as standby comprises:
   setting a device priority as low according to a Virtual Router Redundancy Protocol of the device.

4. The method according to claim 1, further comprising:
   receiving a recovery indication message;
   after receiving the recovery indication message, receiving and synchronizing the user information sent by the on-duty device; and
   after the user information is synchronized, setting the transmission state as main and performing a data stream switching.

5. The method according to claim 4, wherein the recovery indication message is sent by the network management device.

6. The method according to claim 4, wherein setting the transmission state as main and performing the data stream switching comprises:
   distributing a routing to an upstream device to trigger the data stream switching;
   setting the device priority as high according to a Virtual Router Redundancy Protocol of the device, so as to set the transmission state as main; and
   sending Address Resolution Protocol packets to a downstream device.

7. The method according to claim 1, wherein when a resting device comprises a main resting device and a standby resting device, while the on-duty device comprises a main on-duty device and a standby on-duty device, sending the stored user information to the on-duty device comprises:
   sending, by the main resting device, the stored user information to the main on-duty device, and synchronizing, by the main on-duty device, the stored user information with the standby on-duty device; or
   sending, by the main resting device, the stored user information to the main on-duty device, and sending, by the standby resting device, the stored user information to the standby on-duty device; or
   sending, by the main resting device, the stored user information to the main on-duty device, and sending, by the main resting device, the stored user information to the standby on-duty device.

8. The method according to claim 4, wherein when a resting device comprises a main resting device and a standby resting device, while the on-duty device comprises a main on-duty device and a standby on-duty device, receiving and synchronizing the user information stored by the on-duty device comprises:
  receiving and synchronizing, by the main resting device, the user information stored by the main on-duty device, and synchronizing, by the main resting device, the user information with the standby resting device; or
  receiving and synchronizing, by the main resting device, the user information stored by the main on-duty device, and receiving and synchronizing, by the standby resting device, the user information stored by the standby on-duty device; or
  receiving and synchronizing, by the main resting device, the user information stored by the main on-duty device, and receiving and synchronizing, by the standby on-duty device, the user information stored by the main on-duty device.

9. A method for data stream transmission, comprising:
  receiving, by an on-duty device, a message indicating to enter into an energy-saving state;
  after receiving the message indicating to enter into the energy-saving state, receiving and synchronizing, by the on-duty device, user information sent by a resting device; and
  after the user information is synchronized, setting, by the on-duty device, transmission state as main and performing a data stream switching, wherein the data stream switching is performed between the resting device and the on-duty device, and the on-duty device is a device in the working state after the data stream switching, while the resting device is a device in the sleeping state after the data stream switching,
  wherein setting the transmission state as main and performing the data stream switching comprises:
    distributing a user's routing to an upstream device to trigger the data stream switching;
    setting the device priority as high according to a Virtual Router Redundancy Protocol of the device, so as to set the transmission state as main; and
    sending Address Resolution Protocol packets to a downstream device.

10. The method according to claim 9, wherein the message indicating to enter into the energy-saving state is sent by a network management device.

11. The method according to claim 9, further comprising:
  receiving a recovery indication message;
  after receiving the recovery indication message, sending stored user information to the resting device so that the resting device receives and synchronizes the user information; and
  after the user information is synchronized, setting the transmission state as standby.

12. The method according to claim 11, wherein the recovery indication message is sent by a network management device.

13. The method according to claim 11, wherein setting the transmission state as standby comprises:
  setting the device priority as low according to a Virtual Router Redundancy Protocol.

14. The method according to claim 9, wherein when an on-duty device comprises a main on-duty device and a standby on-duty device, while the resting device comprises a main resting device and a standby resting device, receiving and synchronizing the user information sent by the resting device comprises:
  receiving and synchronizing, by the main on-duty device, the user information sent by the main resting device, and synchronizing, by the main on-duty device, the user information with the standby on-duty device; or
  receiving and synchronizing, by the main on-duty device, the user information sent by the main resting device, and receiving and synchronizing, by the standby on-duty device, the user information sent by the standby resting device; or
  receiving and synchronizing, by the main on-duty device, the user information sent by the main resting device, and receiving and synchronizing, by the standby on-duty device, the user information sent by the main resting device.

15. The method according to claim 11, wherein when an on-duty device comprises a main on-duty device and a standby on-duty device, while the resting device comprises a main resting device and a standby resting device, sending the stored user information to the resting device comprises:
  sending, by the main on-duty device, the stored user information to the main resting device, and synchronizing, by the main resting device, the user information with the standby resting device; or
  sending, by the main on-duty device, the stored user information to the main resting device, and sending, by the standby on-duty device, the stored user information to the standby resting device; or
  sending, by the main on-duty device, the stored user information to the main resting device, and sending, by the main on-duty device, the stored user information to the main resting device.

16. A resting device for data transmission, comprising:
  a receiving unit configured to receive a message indicating to enter into an energy-saving state;
  a synchronizing unit configured to send stored user information to an on-duty device for data transmission so that the on-duty device for data transmission receives and synchronizes the user information, after the receiving unit receives the message indicating to enter into the energy-saving state, wherein a data stream switching is performed between the resting device and the on-duty device, and the on-duty device is a device in the working state after the data stream switching, while the resting device is a device in the sleeping state after the data stream switching; and
  a setting unit configured to set transmission state as standby and enter into the sleeping state, after the user information is synchronized,
  wherein after the user information is synchronized, the on-duty device sets transmission state as main and performs a data stream switching, wherein the on-duty device setting the transmission state as main and performing the data stream switching comprises: distributing a user's routing to an upstream device to trigger the data stream switching; setting the device priority as high according to a Virtual Router Redundancy Protocol of the device, so as to set the transmission state as main; and sending Address Resolution Protocol packets to a downstream device.

17. The resting device for data transmission according to claim 16, wherein,
  the receiving unit is further configured to receive a recovery indication message;

the synchronizing unit is further configured to receive and synchronize the user information sent by the on-duty device for data transmission, after the receiving unit receives the recovery indication message; and the setting unit is further configured to set the transmission state as main and perform a data stream switching, after the user information is synchronized.

18. An on-duty device for data transmission, comprising:

a receiving unit configured to receive a message indicating to enter into an energy-saving state;

a synchronizing unit configured to receive and synchronize user information sent by a resting device for data transmission, after the receiving unit receives the message indicating to enter into the energy-saving state; and a setting unit configured to set transmission state as main and perform a data stream switching, after the user information is synchronized, wherein the data stream switching is performed between the resting device and the on-duty device, and the on-duty device is a device in the working state after the data stream switching, while the resting device is a device in the sleeping state after the data stream switching, wherein the setting unit setting the transmission state as main and performing the data stream switching comprises:
  distributing a user's routing to an upstream device to trigger the data stream switching;
  setting the device priority as high according to a Virtual Router Redundancy Protocol of the device, so as to set the transmission state as main; and
  sending Address Resolution Protocol packets to a downstream device.

19. The on-duty device for data transmission according to claim 18, wherein, the receiving unit is further configured to receive a recovery indication message;

the synchronizing unit is further configured to send the stored user information to the resting device for data transmission so that the resting device for data transmission receives and synchronizes the user information, after the receiving unit receives the recovery indication message; and the synchronizing unit is further configured to set the transmission state as standby after the user information is synchronized.

20. A system for data stream transmission, comprising:

a resting device for data transmission configured to: receive a message indicating to enter into an energy-saving state; send stored user information to an on-duty device for data transmission after receiving the message indicating to enter into the energy-saving state; and set transmission state of the resting device as standby and enter into a sleeping state after the user information is synchronized;

the on-duty device for data transmission configured to: receive a message indicating to enter the energy-saving state; receive and synchronize the user information sent by the resting device for data transmission after receiving the message indicating to enter into the energy-saving state; and set the transmission state of the on-duty device as main and perform a data stream switching after the user information is synchronized, wherein the data stream switching is performed between the resting device and the on-duty device, and the on-duty device is a device in the working state after the data stream switching, while the resting device is a device in the sleeping state after the data stream switching, wherein the on-duty device setting the transmission state as main and performing the data stream switching comprises: distributing a user's routing to an upstream device to trigger the data stream switching; setting the device priority as high according to a Virtual Router Redundancy Protocol of the device, so as to set the transmission state as main; and sending Address Resolution Protocol packets to a downstream device; and a network management device configured to detect the network traffic, send the message indicating to enter into the energy-saving state to the resting device for data transmission, and send the message indicating to enter into the energy-saving state to the on-duty device for data transmission.

21. The system for data stream transmission according to claim 20, wherein, the resting device for data transmission is further configured to: receive a recovery indication message; receive and synchronize the user information sent by the on-duty device for data transmission after receiving the recovery indication message; and set the transmission state of the resting device as main and perform a data stream switching after the user information is synchronized;

the on-duty device for data transmission is further configured to: receive a recovery indication message; send the stored user information to the resting device for data transmission so that the resting device for data transmission receives and synchronizes the user information, after receiving the recovery indication message; and set the transmission state of the on-duty device as standby after the user information is synchronized; and the network management device is further configured to detect the network traffic, send the recovery indication message to the resting device for data transmission, and send the recovery indication message to the on-duty device for data transmission.

* * * * *